United States Patent [19]
Hayek et al.

[11] Patent Number: 5,918,025
[45] Date of Patent: Jun. 29, 1999

[54] METHOD AND APPARATUS FOR CONVERTING A FIVE WIRE ARBITRATION/BUFFER MANAGEMENT PROTOCOL INTO A TWO WIRE PROTOCOL

[75] Inventors: George R. Hayek, Cameron Park; Brian Langendorf, El Dorado Hills; Jasmin Ajanovic; Rajeev K. Prasad, both of Folsom, all of Calif.

[73] Assignee: Intel Corporation, Santa Clara, Calif.

[21] Appl. No.: 08/775,807

[22] Filed: Dec. 31, 1996

[51] Int. Cl.⁶ .................................................. G06F 13/00
[52] U.S. Cl. ........................ 395/287; 395/285; 395/308
[58] Field of Search ................................... 395/306, 308, 395/309, 285, 284, 287, 831

[56] References Cited

U.S. PATENT DOCUMENTS

| | | | |
|---|---|---|---|
| 5,568,619 | 10/1996 | Blackledge et al. ..................... | 395/281 |
| 5,596,729 | 1/1997 | Lester et al. .............................. | 395/308 |
| 5,664,117 | 9/1997 | Shah et al. ................................ | 395/280 |
| 5,673,400 | 9/1997 | Kenny ....................................... | 395/309 |
| 5,717,873 | 2/1998 | Rabe et al. ................................ | 395/290 |
| 5,717,876 | 2/1998 | Robertson ................................. | 395/309 |

*Primary Examiner*—Glenn A. Auve
*Attorney, Agent, or Firm*—Blakely, Sokoloff, Taylor & Zafman LLP

[57] ABSTRACT

A method for converting signals from one arbitration and management protocol to another. The conversion is performed by at least three state machines. The conversion circuit converts a set of signals on the first bus to a bus request signal on the second bus. The conversion circuit also converts a signal from the second bus and a set of signals on the first bus to bus grant and memory acknowledge signals on the first bus.

29 Claims, 3 Drawing Sheets

METHOD AND APPARATUS FOR CONVERTING A FIVE WIRE ARBITRATION/BUFFER MANAGEMENT PROTOCOL INTO A TWO WIRE PROTOCOL

BACKGROUND OF THE INVENTION

1. Field of the Invention

The present invention relates to the field of computer systems; more particularly, the present invention relates to a method and apparatus for providing inter-operability of different Peripheral Component Interconnect (PCI) building blocks, such as a host bridge to connect a Central Processing Unit (CPU) and memory subsystem to a PCT bus and an expansion bus bridge to connect an Industry Standard Architecture (ISA) bus or an Extended Industry Standard Architecture (EISA) bus to the PCI bus.

2. Description of Related Art

A Peripheral Component Interconnect (PCI) bus is a high speed Input/Output (I/O) bus for a computer system. The PCI signals and specifications are defined in the PCI specifications version 2.0 or above. The PCI specifications are endorsed by an industry organization of which Intel Corporation of Santa Clara, Calif. is a member. The PCI bus is coupled to a CPU and memory through a host bridge. A Small Computer System Interface (SCSI) host adapter may be coupled to the PCI bus to interface to devices such as disk drives, tape drives, and Compact Disk-Read Only Memory (CD-ROM). In addition, a graphics adapter may be coupled to the PCI bus to interface to video frame buffers and a local-area network (LAN) adapter may be coupled to the PCI bus to interface to a LAN.

The PCI bus is also coupled to an expansion bus through an expansion bus bridge. The expansion bus may be an Industry Standard Architecture (ISA) bus or an Extended Industry Standard Architecture (EISA) bus. Devices connected to the expansion bus may include bus masters which generate and respond to requests from other devices (either from the expansion bus or the PCI bus) and slaves such as memory and I/O devices that only respond to requests from other devices.

The host bridge contains an arbiter for the PCI bus which uses an algorithm to determine which bus master is granted control of the PCI bus when multiple bus Masters have requested use of the PCI bus. The arbiter asserts a signal corresponding to the bus master which is granted access to the PCI bus.

The host bridge, expansion bus bridge, and other devices on the PCI bus may have write buffers to improve performance according to well-known methods. A posted write buffer for the host bridge, for example, would post data received from the memory or CPU in a buffer and indicate that the data has been transferred. This allows the memory or CPU to proceed to subsequent operations while the host bridge waits for access to the PCI bus to perform the necessary operation to the target device. A posted write buffer for the expansion bus bridge stores information directed to the expansion bus and information directed to the PCI bus.

In order to maintain memory coherency and prevent deadlocks (e.g. where two or more bus masters require access to the bus before the other can proceed), a flush of some or all of the posted write buffers may be necessary before proceeding with another request according to well-known methods. When a flush is requested, valid writes in the posted write buffer are written to the target device and invalidated in the posted write buffer before a subsequent operation is performed. In some cases, only those writes directed towards the PCI bus and not to the EISA bus are flushed. In other cases, writes directed towards the EISA bus are flushed through the PCI bus.

In the following description, conventional symbols for signal names are used. For example, the symbol "#" indicates an active LOW signal. The expansion bus bridge performs arbitration and buffer management for the use of the PCI bus to the host bridge using five signals: (1) a PCI bus request (REQ#) signal which indicates that a bus master is requesting access to the PCI bus, (2) a PCI bus grant (GNT#) signal which indicates that the arbiter has granted access to that bus master, (3) a flush request (FLSHREQ#) signal which initiates a flush of the posted write buffers containing valid writes directed towards the PCI bus and then temporarily disables the posted write buffers, (4) a memory request (MEMREQ#) signal which initiates a flush of the posted write buffers containing valid writes directed towards the memory and temporarily disables the posted write buffers, (5) and a memory acknowledge (MEMACK#) signal that indicates that the posted write buffer flush corresponding to either the FLSHREQ# signal or the MEMREQ# signal is completed.

The prior art host bridge manufactured by Intel Corporation of Santa Clara, Calif., incorporates a two signal arbitration and buffer management control scheme including a PCI Hold (PHLD#) signal and a PCI Hold Acknowledge (PHLDA#) signal. The PHLD# signal is used to request the PCI bus while the PHLDA# signal is used to acknowledge the request. A state-machine is used to recognize whether a flush request, bus request, or memory request is being made.

In order to perform arbitration of the expansion bus bridge requests, the arbitrator in the host bridge which uses a two-signal protocol described above must be able to process the requests from the expansion bus which uses the five-signal protocol described above. One solution is to provide a new expansion bus bridge which uses the two-wire protocol of the host bridge. However, this requires that users who upgrade their CPU subsystem to include the prior art host bridge will also have to upgrade the expansion bus bridge to maintain a compatible protocol.

What is needed is a method to interface the two-signal arbitration and buffer management protocol of the host bridge to the five-signal buffer management protocol of the expansion bus bridge. In addition, it is desirable to make the arbitration and buffer management protocol selectable depending on the expansion bus bridge such that the host bridge may be upgraded without upgrading the expansion bus bridge.

SUMMARY OF THE INVENTION

The present invention discloses a method and apparatus for converting a first arbitration and buffer management protocol used by a first bus to a second arbitration and buffer management protocol used by a second bus. The conversion circuit receives a first plurality of signals on the first bus and generates a signal on the second bus in response to the first plurality of the first bus signals. The conversion circuit also receives a second signal on the second bus and generates a second plurality of signals on the first bus in response to the second signal and the first plurality of signals.

BRIEF DESCRIPTION OF THE DRAWINGS

The features and advantages of the present invention will become apparent from the following detailed description of the present invention in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention describes a method of converting signals between two arbitration/buffer/management protocols. As shown herein, various state machines are implemented to generate the bus request, the bus grant, and the memory acknowledge signals. These state machines essentially perform the conversion of signals between the two protocols so that existing hardware can be used with new processors without significant changes.

In the following description, conventional terminology and symbols are used. For example, the symbol "#" for a signal name indicates that the signal is active LOW. The terms "assert" and "de-assert" are used to indicate that the corresponding signal is at its associated active and inactive levels, respectively.

Figure 1:
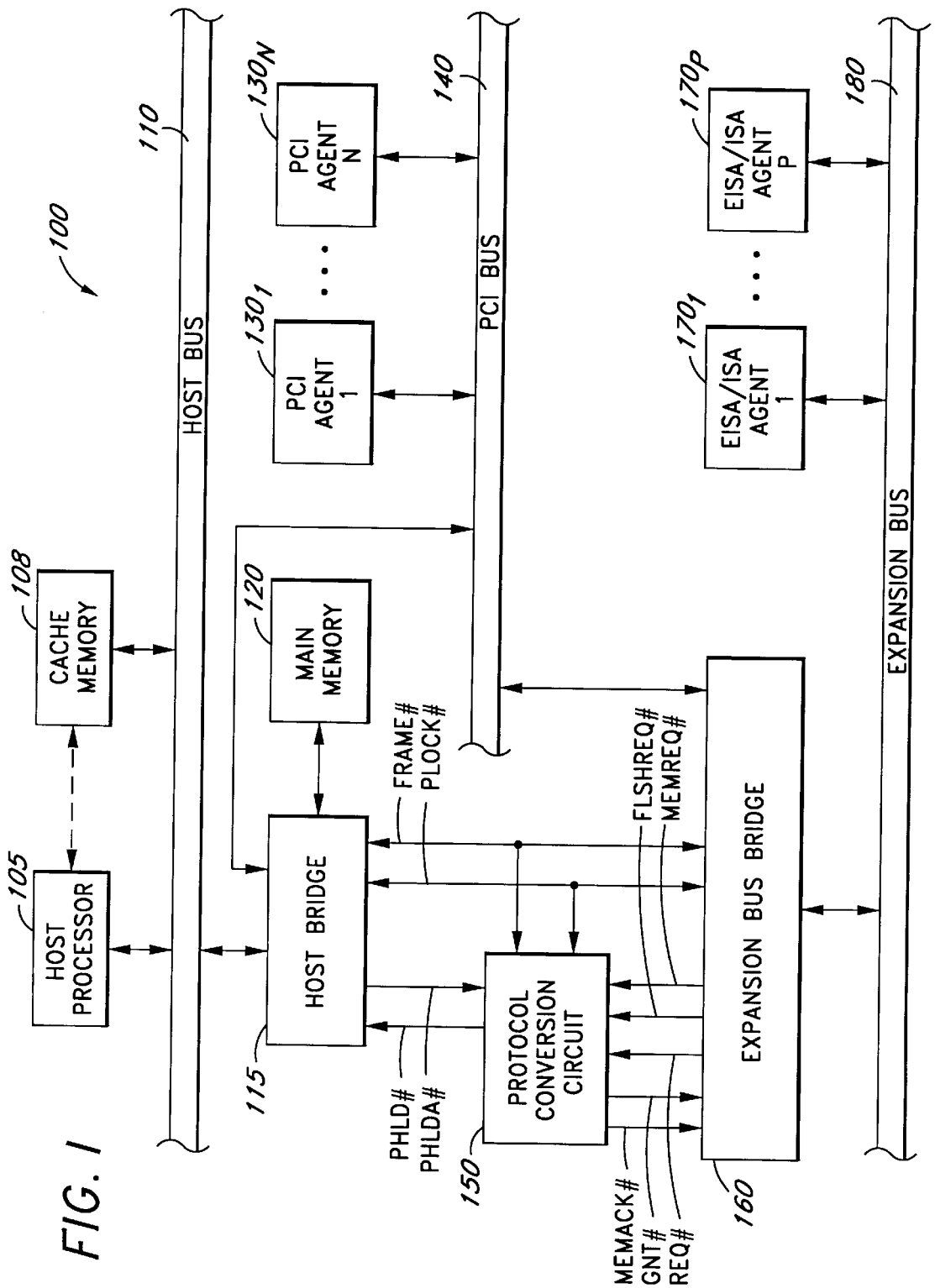
FIG. 1 illustrates one embodiment of the computer system of the present invention.

FIG. 1 illustrates the computer system of the present invention. Computer system 100 comprises of a plurality of buses, elements and processors connected to these bus, and a circuit to perform the protocol conversion. In this preferred embodiment, there are three buses: host bus 110, PCI bus 140 and expansion bus 180. Each of the PCI bus 140 and the expansion bus 180 can be any peripheral bus. It is contemplated that these three buses are for illustrative purposes. Of course, more buses may be used. Host processor 105, cache memory element 108, and host bridge 115 are coupled to host bus 110. A main memory element 120 is coupled to host bridge 115. Peripheral agents $130_1$ though $130_N$ ("N" being a positive whole number) are coupled to PCI bus 140 and to host bridge 115. Expansion agents (e.g., EISA/ISA agents) $170_1$ through $170_P$ ("P" is a positive whole number) are coupled to expansion bus 180 while the Expansion bus bridge 160 is coupled to expansion bus 180 and PCI bus 140. Protocol conversion circuit 150 is coupled to host bridge 115 and expansion bus bridge 160. The integration of the above buses and elements is described in the following.

Description of the Signals:

Signals associated with Host bridge 115:

PHLD#: PCI HOLD. This signal is used to request for the PCI bus. The host bridge flushes the DRAM write buffers and the posted write buffers pointing toward the PCI bus, and then acquires the host bus before granting the request via the PHLDA# signal. This ensures that the guaranteed access time is met for EISA/ISA masters.

PHLDA#: PCI HOLD ACKNOWLEDGE. This signal is driven by the host bridge to grant PCI to the EISA/ISA bus requester.

Signals associated with Expansion bus bridge:

MEMREQ#: MEMORY REQUEST. This signal is asserted by the Expansion bus bridge (along with the FLSHREQ# signal) to indicate that the peripheral device requires ownership of main memory.

FLSHREQ#: FLUSH REQUEST. This signal is asserted by the Expansion bus bridge to command all of the system's posted write buffers pointing towards PCI to be flushed.

REQ#: REQUEST. This signal is asserted by a bus master to request the PCI Bus.

MEMACK#: MEMORY ACKNOWLEDGE. This signal is the response handshake that indicates that the function requested over the MEMREQ# and/or FLSHREQ# signals has been completed.

GNT#: GRANT. This signal is asserted to indicate that the PCI master has been granted the PCI Bus Expansion bus bridge.

Signals common to Host bridge 115 and Expansion bus bridge 160:

FRAME#: FRAME. This signal is driven by the current initiator to indicate the beginning and duration of an access. The FRAME# signal is asserted to indicate that a bus transaction is beginning. When the FRAME# signal is de-asserted, the transaction is in the final data phase. The FRAME# signal is, an input to the expansion bus bridge when the expansion bus bridge is the target. The FRAME# signal is an output from the expansions bus bridge when the expansion bus bridge is the initiator.

PLOCK#: PCI LOCK. This signal indicates an atomic operation that may require multiple transactions to complete. The PLOCK# signal is an input to the expansion bus bridge when the expansion bus bridge is the target and an output from the expansion bus bridge when the expansion bus bridge is the initiator.

Referring back to FIG. 1, host processor 105 is any microprocessor. It is contemplated that host processor 105 is a microprocessor from the X86 family including the PENTIUM®, or PENTIUM PRO® microprocessors. Furthermore, there may be more than one host processor forming a multiprocessor system. Host bus 110 allows host processor 105 to communicate with other devices, including other processors. Cache memory element 108 is connected to host bus 110 to provide fast accesses.

Host bridge 115 provides the interface between host processor 105 to a main memory element 120 (e.g., Dynamic Random Access Memory "DRAM" or Static Random Access Memory "SRAM"). Host bridge 115 interfaces with PCI agents $130_1$–$130_N$ through PCI bus 140. Host bridge 115 receives one input line propagating the PHLD# signal and one output line propagating the PHLDA# signal from the protocol conversion circuit 150. The PLOCK# and FRAME# signals are also used by the host bridge 115.

Expansion bus bridge 160 provides the interface between host bridge 115 and Expansion bus 180. Expansion bus bridge 160 is coupled to the protocol conversion circuit 150 through a plurality of signal lines. As shown, the expansion bus bridge 160 receives MEMACK# and GNT# signals as inputs, and generates three outputs; namely, REQ#, FLSHREQ# and MEMREQ# signals. Expansion bus bridge 160 also uses the two signals PLOCK# and FRAME# for additional status information. Expansion bus 180 provides a communication path between the host processor 105, main memory 120, or PCI bus agents $130_1$ through $130_N$ and a number of expansion bus agents. The expansion bus 180 may include the Extended Industry Standard Architecture (EISA), Industry Standard Architecture (ISA), or any other type of bus architecture. EISA/ISA agents $170_1$ through $170_P$ are peripheral devices connected to expansion bus 180.

Protocol conversion circuit 150 performs the conversion of the signals associated with the two protocols. Protocol conversion circuit 150 essentially implements the following state machines:

PHLD# State Machine: to generate the PHLD# signal from the REQ#, FLSHREQ#, MEMREQ#, FRAME# and PLOCK# signals.

GNT# State Machine: to generate the GNT# signal from the REQ#, PHLD# signal and state variable from the PHLD# state machine.

MEMACK# State Machine: to generate the MEMACK# signal from the FLSHREQ#, MEMREQ#, PHLDA# signals and state variables from the PHLD# state machine.

In the following description, an active low signal is asserted when it is at the logic LOW level, and is de-asserted when it is at the logic HIGH level. In the state diagrams, an asserted active LOW signal is shown with the logical "NOT" symbol (!) in from of the signal name, e.g., ! PHLD# similarly, a de-asserted active LOW signal is shown without the logical NOT symbol, e.g., PHLD#. The logical AND and OR operations are shown symbolically as "&" and "+", respectively.

Figure 2:
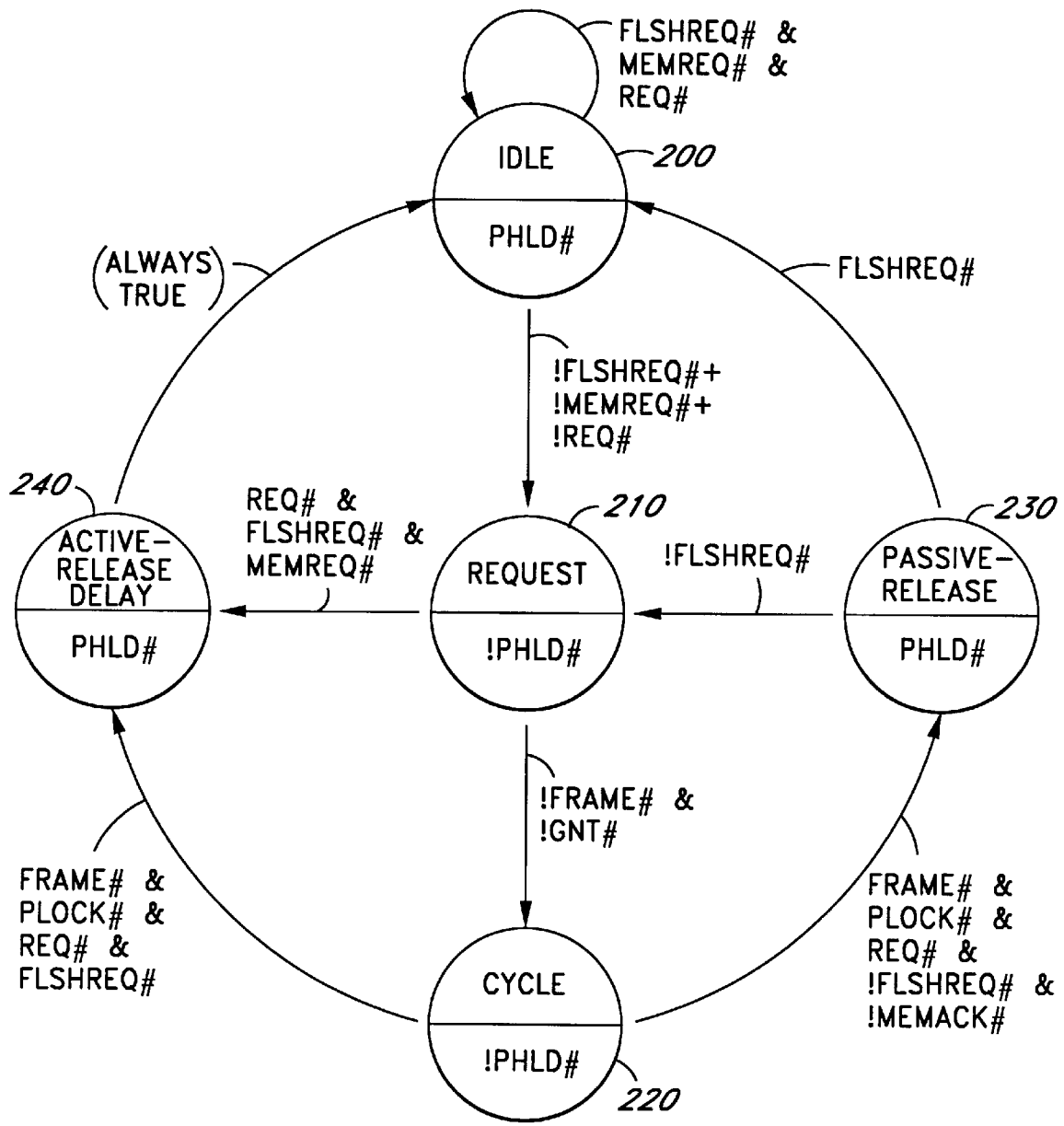
FIG. 2 is a state diagram illustrating the state machine to generate the PHLD# signal.

FIG. 2 illustrates the state diagram of one embodiment of the method for converting the REQ#, FLSHREQ#, MEMREQ#, FRAME# and PLOCK# signals, to produce the PHLD# signal.

In the IDLE state 200, the PHLD# signal is de-asserted to indicate that a memory request is not outstanding. If one of the PCI bus arbitration request signals is asserted, the state machine enters a request state.

In the REQUEST state 210, the PHLD# signal is asserted to indicate that a bus request is being made. If all of the PCI bus arbitration request signals are de-asserted before the FRAME# and GNT# signals are asserted, the state machine enters the ACTIVE-RELEASE DELAY state 240. If the FRAME# and GNT# signals are asserted before all of the request signals are de-asserted, the state machine enters the CYCLE state 220.

In the CYCLE state 220, the PHLD# signal is asserted to indicate that the request is still active. If the FRAME#, PLOCK#, REQ# and FLSHREQ# signals are de-asserted to indicate that there is no current bus cycle, the bus is not locked, and a bus request or a flush request is not outstanding, the state machine enters the ACTIVE-RELEASE DELAY state 240. If the FRAME#, PLOCK#, and REQ# signals are de-asserted to indicate that there is no current bus cycle, the bus is not locked, and a bus request is not outstanding and the FLSHREQ# and MEMACK# signals are asserted to indicate that a flush of the posted PCI write buffers has been completed and the posted PCI write buffers are currently disabled, the state machine enters the PASSIVE-RELEASE state 230.

In the PASSIVE-RELEASE state 230, the PHLD# signal is de-asserted for a single clock cycle. If the FLSHREQ# signal is still asserted, the state machine enters the REQUEST state 210 described above. If the FLSHREQ# signal is de-asserted, the state machine returns to the IDLE state 200 described above.

In the ACTIVE-RELEASE DELAY state 240, the PHLD# signal is de-asserted and then the state machine automatically enters the IDLE state 200 where the PHLD# signal is also de-asserted. This state change is used, for example, when a PCI bus request arbitration signal was asserted speculatively and subsequent information indicated that the request is no longer desirable.

Figure 3:
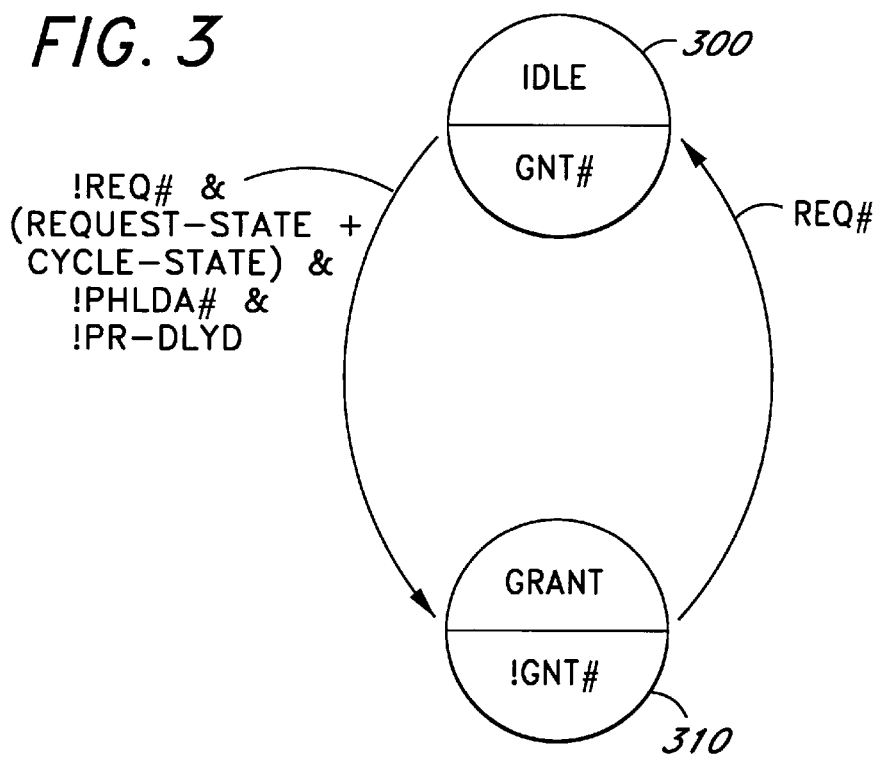
FIG. 3 is a state diagram illustrating the state machine to generate the GNT# signal.

FIG. 3 illustrates the state diagram of one embodiment of the method for converting the 5-wire PCI bus arbitration request signals, bus request (REQ#), the 2-wire PCI bus arbitration grant signal (PHLDA#) and state variables from the PHLD# state machine to produce the 5-wire arbitration grant signal (GNT#).

In the IDLE state 300, the GNT# signal is de-asserted to indicate that the PCI bus is not granted to the EISA bridge. When the REQ# and PHLDA# signals are asserted to indicate an outstanding bus request that has been acknowledged, the PCI bus is in either the CYCLE state or the REQUEST state and the PASSIVE-RELEASE-DELAYED (PR-DLYD) signal is asserted (PR-DLYD is a one PCI clock delayed version of the passive-release state variable), the state machine enters the GRANT state 310.

In the GRANT state 310, the GNT# signal is asserted to indicate that the PCI bus is granted to the EISA bridge. When the REQUEST signal is de-asserted to indicate that the EISA bridge no longer requests the PCI bus, the state machine returns to the IDLE state 300.

Figure 4:
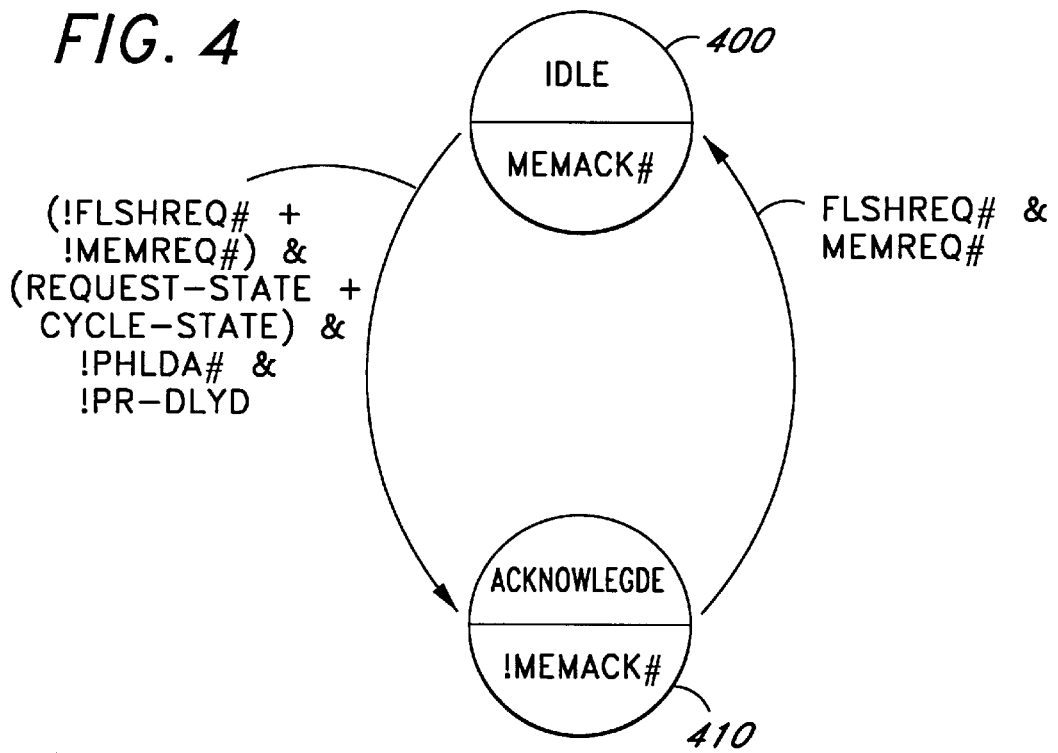
FIG. 4 is a state diagram illustrating the state machine to generate the MEMACK# signal.

FIG. 4 illustrates the state diagram of one embodiment of the method for converting the 5-wire PCI bus arbitration request signals, FLSHREQ# and MEMREQ#, the 2-wire PCI bus arbitration acknowledge signal (PHLDA#) and state variables from the PHLD# state machine to produce the 5-wire arbitration acknowledge signal (MEMACK#).

In the IDLE state 400, the MEMACK# signal is de-asserted to indicate that there is no pending flush request or memory request. When the FLSHREQ# and MEMREQ# signals are asserted to indicate an outstanding flush request or bus request, the PCI bus is in either the CYCLE state or the REQUEST state (shown as states 220 and 210, respectively, in FIG. 2) PHLDA# signal is asserted, and the PASSIVE-RELEASE-DELAYED (PR-DLYD) signal is asserted (PR-DLYD is a one PCI clock delayed version of the passive-release state variable), the state machine enters the ACKNOWLEDGE state 410.

In the ACKNOWLEDGE state 410, the MEMACK# signal is asserted to indicate that the PCI posted write buffers have been flushed (in the case of a FLSHREQ#) or the memory write buffers have been written to a memory (in the case of a MEMREQ#) that is snooped such that stale data will not. When the FLSHREQ# and the MEMREQ# signals are de-asserted, the state machine returns to the IDLE state 400.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention. For example, reference is made to asserted signals corresponding to various levels. It will be apparent to one skilled in the art that different levels may be used for an asserted signal.

What is claimed is:

1. A method for translating a first protocol used by a first bus to a second protocol used by a second bus comprising:

configuring a state machine into N states, the N states corresponding to N conditions related to usage of one of the first bus and the second bus;

receiving a triggering signal representing a first plurality of signals in accordance with the first protocol on the first bus;

transitioning from a first state to a second state in response to the triggering signal, the first state being any one of the N states;

generating a first signal in accordance with the second protocol on the second bus corresponding to the any one of the N states;

receiving a second signal in accordance with the second protocol on the second bus; and generating a second plurality of signals in accordance with the first protocol on the first bus in response to the second signal and the first plurality of signals.

2. The method of claim 1 wherein receiving the triggering signal further comprises asserting at least one request signal to indicate that a bus master is requesting to use the second bus.

3. The method of claim 2 wherein configuring a state machine further comprises:

configuring five states which include a first idle state, a request state, a cycle state, a passive release state and an active release delay state.

4. The method of claim 3 wherein transitioning further comprises transitioning from the first idle state to the first idle state when the triggering signal indicates that all request signals are de-asserted.

5. The method of claim 3 wherein transitioning further comprises transitioning from the first idle state to the request state when the triggering signal indicates that at least one request signal is asserted.

6. The method of claim 3 wherein transitioning further comprises transitioning from the request state to the cycle state when the triggering signal indicates that a request for the second bus has been granted and a bus transaction is beginning.

7. The method of claim 3 wherein transitioning further comprises transitioning from the cycle state to the passive release state when the triggering signal indicates that there is no current bus cycle, the second bus is not locked, a bus request is not outstanding, a flush of a posted write buffer on the second bus has been completed, and the posted write buffer is currently disabled.

8. The method of claim 3 wherein transitioning further comprises transitioning from the passive release state to the request state when the triggering signal indicates that a flush is asserted.

9. The method of claim 3 wherein transitioning further comprises transitioning from the passive release state to the first idle state when the triggering signal indicates that a flush request is de-asserted.

10. The method of claim 3 wherein transitioning further comprises transitioning from the request state to the active release delay state if the triggering signal indicates that a flush request is de-asserted.

11. The method of claim 3 wherein transitioning further comprises transitioning from the cycle state to the active release delay state when the triggering signal indicates that there is no current bus cycle, the second bus is not locked, a bus request is not outstanding and a flush request is not outstanding.

12. The method of claim 3 wherein transitioning further comprises transitioning from the active release delay state to the first idle state regardless of the triggering signal.

13. The method of claim 3 wherein a request signal for the second bus is de-asserted when the state machine is in the first idle state.

14. The method of claim 3 wherein a request signal for the second bus is asserted when the state machine is in one of the request state and the cycle state.

15. The method of claim 3 wherein configuring a state machine further comprises:

configuring four states which include a second idle state, a third idle state, a grant state, and an acknowledge state.

16. The method of claim 15 wherein transitioning further comprises transitioning from the second idle state to the grant state when the triggering signal indicates that an outstanding bus request has been acknowledged, and a delayed version of a second bus is in one of the cycle state and the request state.

17. The method of claim 15 wherein transitioning further comprises transitioning from the grant state to the second idle state when the triggering signal indicates that the first protocol no longer requests the second bus.

18. The method of claim 15 wherein transitioning further comprises transitioning from the third idle state to the acknowledge state when the triggering signal indicates that a flush request or a bus request is outstanding, the second bus is in one of the cycle state and the request state, and a delayed version of the passive release delay state is asserted.

19. The method of claim 18 wherein a memory acknowledge signal for indicating that either a posted write buffer has been flushed or a memory write buffer has been written is de-asserted when the state machine is in the second idle state.

20. The method of claim 18 wherein a memory acknowledge signal for indicating that either a posted write buffer has been flushed or a memory write buffer has been written is asserted when the state machine is in the acknowledge state.

21. The method of claim 15 wherein transitioning further comprises transitioning from the acknowledge state to the third idle state when the triggering state indicates that a flush request and a memory request are de-asserted.

22. A system comprising:

a host bus;

at least one host processor coupled to the host bus;

a host bridge coupled to the host bus and a peripheral bus, the host bridge enabling communication between the at least one host processor and a plurality of peripheral bus agents using a first protocol;

an expansion bus bridge coupled to the host bridge and an expansion bus, the expansion bus bridge enabling communication between a plurality of expansion bus agents and the at least one host processor using a second protocol; and a circuit coupled to the host bridge and the expansion bus bridge, the circuit converting the first and second protocols between the host bridge and the expansion bus bridge, the circuit comprising:

a state machine having N states, the N states corresponding to N conditions related to usage of one of the first bus and the second bus, the state machine transitioning from a first state to a second state in response to a triggering signal, the first state being any one of the N states, the triggering signal corresponding to a first plurality of signals in accordance with the first protocol on the first bus, the state machine generating a first signal in accordance with the second protocol on the second bus corresponding to the any one of the N states, the state machine generating a second plurality of signals on the first bus in response to a second signal received from the second bus and the triggering signal.

23. The system of claim 22 wherein the state machine generates at least one of a peripheral request signal for requesting the peripheral bus, a peripheral grant signal for granting the peripheral bus, and a memory acknowledge signal for acknowledging a memory access request.

24. The system of claim 23 wherein the memory access request includes a request for accessing the main memory and a request for flushing posted write buffers in the host bridge to a main memory.

25. A circuit for translating a first protocol used by a first bus to a second protocol used by a second bus, the circuit comprising:

a state machine having N states, the N states corresponding to N conditions related to usage of one of the first bus and the second bus, the state machine transitioning from a first state to a second state in response to a triggering signal, the first state being any one of the N states, the triggering signal corresponding to a first plurality of signals in accordance with the first protocol on the first bus, the state machine generating a first signal in accordance with the second protocol on the second bus corresponding to the any one of the N states, the state machine generating a second plurality of signals on the first bus in response to a second signal received from the second bus and the triggering signal.

26. The circuit of claim 25 wherein the first signal on the second bus includes a request for the second bus.

27. The circuit of claim 28 wherein the first plurality of signals received from the first bus includes at least one of a memory request, a flush request, and a second bus master request.

28. The circuit of claim 25 wherein the second plurality of signals received on the first bus includes at least one of a grant and a memory acknowledge.

29. The circuit of claim 25 wherein the second signal received from the second bus includes an acknowledge of a request for the second bus.

* * * * *

UNITED STATES PATENT AND TRADEMARK OFFICE
CERTIFICATE OF CORRECTION

PATENT NO. : 5,918,025
DATED : June 29, 1999
INVENTOR(S) : Hayek et al.

It is certified that error appears in the above-identified patent and that said Letters Patent is hereby corrected as shown below:

Column 1,
Line 14, delete "PCT" and insert -- PCI --.

Column 4,
Line 27, delete "is," and insert -- is --.

Column 10,
Line 8, delete "claim 28" and insert -- claim 25 --.

Signed and Sealed this

Twentieth Day of May, 2003

JAMES E. ROGAN
*Director of the United States Patent and Trademark Office*